United States Patent
Li et al.

(10) Patent No.: US 9,826,591 B2
(45) Date of Patent: Nov. 21, 2017

(54) BUTTON BACKLIGHT PROCESSING METHOD AND APPARATUS AND TERMINAL DEVICE

(71) Applicant: Huawei Device Co., Ltd., Shenzhen (CN)

(72) Inventors: Zhihua Li, Wuhan (CN); Changming Liu, Xi'an (CN); Tao Yan, Xi'an (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 14/980,424

(22) Filed: Dec. 28, 2015

(65) Prior Publication Data

US 2016/0113074 A1    Apr. 21, 2016

Related U.S. Application Data

(63) Continuation of application No. PCT/CN2014/082007, filed on Jul. 11, 2014.

(30) Foreign Application Priority Data

Jul. 11, 2013   (CN) .......................... 2013 1 0292128

(51) Int. Cl.
*H05B 33/08*    (2006.01)
*H04M 19/04*    (2006.01)
(Continued)

(52) U.S. Cl.
CPC ............ *H05B 33/086* (2013.01); *H04M 1/22* (2013.01); *H04M 19/048* (2013.01); *H04W 88/02* (2013.01); *H01H 13/023* (2013.01)

(58) Field of Classification Search
CPC .............................. H04M 1/22; H05B 33/086
(Continued)

(56) References Cited

U.S. PATENT DOCUMENTS

| 2005/0190196 | A1* | 9/2005 | O'Neil | ................. G06F 3/0238 345/589 |
| 2008/0129719 | A1* | 6/2008 | Jonsson | ................. H04M 1/22 345/206 |

(Continued)

FOREIGN PATENT DOCUMENTS

| CN | 1763879 A | 4/2006 |
| CN | 1852341 A | 10/2006 |

(Continued)

OTHER PUBLICATIONS

Foreign Communication From a Counterpart Application, European Application No. 14823792.8, Extended European Search Report dated May 3, 2016, 6 pages.

(Continued)

*Primary Examiner* — Jason M Crawford
(74) *Attorney, Agent, or Firm* — Conley Rose, P.C.

(57) ABSTRACT

A button backlight processing method and apparatus and a terminal device. The button backlight processing method includes receiving an instruction for turning on button backlight; obtaining a button backlight parameter according to the instruction, where the button backlight parameter is corresponding to a current theme interface of a terminal device; and turning on the button backlight according to the button backlight parameter. The embodiments of the present disclosure achieve a color diversity of button backlight, and meet individualized requirements of users.

12 Claims, 7 Drawing Sheets

(51) Int. Cl.
*H04W 88/02* (2009.01)
*H04M 1/22* (2006.01)
*H01H 13/02* (2006.01)

(58) Field of Classification Search
USPC ................................ 345/102, 156, 204, 690
See application file for complete search history.

(56) References Cited

U.S. PATENT DOCUMENTS

| | | | |
|---|---|---|---|
| 2008/0164823 A1 | 7/2008 | Huang et al. | |
| 2008/0252599 A1* | 10/2008 | Ross | H04N 5/262 345/157 |
| 2009/0143108 A1* | 6/2009 | Chiba | H04M 1/22 455/566 |
| 2009/0309711 A1 | 12/2009 | Adappa et al. | |
| 2010/0238120 A1 | 9/2010 | Hsieh | |
| 2011/0062889 A1* | 3/2011 | Hoogzaad | G09G 3/342 315/294 |
| 2011/0111797 A1* | 5/2011 | Toba | G06F 3/0202 455/556.1 |
| 2011/0128166 A1* | 6/2011 | Kagami | G06F 3/0233 341/22 |
| 2013/0113388 A1* | 5/2013 | Reams | H05B 33/0854 315/250 |
| 2013/0181612 A1* | 7/2013 | Ohno | H05B 37/02 315/151 |
| 2013/0221855 A1* | 8/2013 | Lazaridis | H05B 37/0218 315/149 |
| 2013/0240933 A1* | 9/2013 | Yamazaki | H01L 33/504 257/98 |
| 2013/0271004 A1* | 10/2013 | Min | H05B 33/0842 315/112 |
| 2014/0267466 A1* | 9/2014 | Takagi | G09G 3/36 345/691 |

FOREIGN PATENT DOCUMENTS

| | | |
|---|---|---|
| CN | 101222797 A | 7/2008 |
| CN | 101753663 A | 6/2010 |
| CN | 102119521 A | 7/2011 |
| CN | 103428966 A | 12/2013 |
| EP | 1914965 A1 | 4/2008 |
| KR | 20040051861 A | 6/2004 |

OTHER PUBLICATIONS

Partial English Translation and Abstract of Chinese Patent Application No. CN001763879, Nov. 20, 2015, 3 pages.
Partial English Translation and Abstract of Chinese Patent Application No. CN101753663, Nov. 20, 2015, 2 pages.
Partial English Translation and Abstract of Chinese Patent Application No. CN103428966, Nov. 20, 2015, 3 pages.
Foreign Communication From a Counterpart Application, Chinese Application No. 201310292128.5, Chinese Office Action dated Nov. 18, 2014, 10 pages.
Foreign Communication From a Counterpart Application, PCT Application No. PCT/CN2014/082007, English Translation of International Search Report dated Oct. 15, 2014, 2 pages.
Foreign Communication From a Counterpart Application, PCT Application No. PCT/CN2014/082007, English Translation of Written Opinion dated Oct. 15, 2014, 11 pages.

* cited by examiner

BUTTON BACKLIGHT PROCESSING METHOD AND APPARATUS AND TERMINAL DEVICE

CROSS-REFERENCE TO RELATED APPLICATIONS

This application is a continuation of International Application No. PCT/CN2014/082007, filed on Jul. 11, 2014, which claims priority to Chinese Patent Application No. 201310292128.5, filed on Jul. 11, 2013, both of which are hereby incorporated by reference in their entireties.

TECHNICAL FIELD

Embodiments of the present disclosure relate to communications technologies, and in particular, to a button backlight processing method and apparatus and a terminal device.

BACKGROUND

Currently, as terminal devices such as mobile phones and tablet computers are widely prevalent, screens become main interfaces for human computer interaction, which significantly enhances the convenience of human computer interaction, and gorgeous interfaces also bring ultimate visual experience to people. Using a mobile phone as an example, there are generally several virtual buttons or physical buttons below the screen of the mobile phone. When a user performs a button operation, button backlight is turned on; especially in a relatively dark environment, turning on the button backlight is more helpful in clearly seeing an operated button.

Existing button backlight includes only white light; as a result, display is monotonous, which cannot meet individualized requirements of users.

SUMMARY

Embodiments of the present disclosure provide a button backlight processing method and apparatus and a terminal device, to achieve a color diversity of button backlight, and meet individualized requirements of users.

According to a first aspect, an embodiment of the present disclosure provides a button backlight processing method, including receiving an instruction for turning on button backlight; obtaining a button backlight parameter according to the instruction, where the button backlight parameter is corresponding to a current theme interface of a terminal device; and turning on the button backlight according to the button backlight parameter.

With reference to the first aspect, in a first possible implementation manner of the first aspect, the button backlight parameter includes a first duty cycle of a red component, a second duty cycle of a green component, and a third duty cycle of a blue component in a color of the theme interface; and the turning on the button backlight according to the button backlight parameter includes correspondingly driving, according to the first duty cycle, the second duty cycle, and the third duty cycle, a red backlight, a green backlight, and a blue backlight that are disposed under a button.

With reference to the first aspect or the first possible implementation manner of the first aspect, in a second possible implementation manner of the first aspect, the obtaining a button backlight parameter includes obtaining configuration information of the color components in the color of the theme interface, where the configuration information of the color components includes a luminance value of the red component, a luminance value of the green component, and a luminance value of the blue component; and obtaining, according to the configuration information of the color components, the button backlight parameter corresponding to the theme interface through calculation by using a preset algorithm.

With reference to the first aspect or the first possible implementation manner of the first aspect, in a third possible implementation manner of the first aspect, the obtaining a button backlight parameter includes obtaining a button backlight parameter that has been stored.

With reference to the third possible implementation manner of the first aspect, in a fourth possible implementation manner of the first aspect, before the obtaining a button backlight parameter that has been stored, the method further includes obtaining theme interface update information of the terminal device; obtaining configuration information of color components in a color of an updated theme interface, where the configuration information of the color components includes a luminance value of a red component, a luminance value of a green component, and a luminance value of a blue component; obtaining, according to the configuration information of the color components, a button backlight parameter corresponding to the theme interface through calculation by using a preset algorithm; and storing the updated button backlight parameter corresponding to the theme interface; and the obtaining a button backlight parameter that has been stored includes obtaining the stored updated button backlight parameter corresponding to the theme interface.

With reference to the fourth possible implementation manner of the first aspect, in a fifth possible implementation manner of the first aspect, before the obtaining theme interface update information of the terminal device, the method further includes monitoring a registration entry that records the theme interface; and the obtaining theme interface update information of the terminal device includes obtaining the theme interface update information when it is detected that the registration entry is modified.

With reference to the third possible implementation manner of the first aspect, in a sixth possible implementation manner of the first aspect, the obtaining a button backlight parameter that has been stored includes obtaining information about the current theme interface; and obtaining the button backlight parameter corresponding to the current theme interface according to a correspondence, prestored in the terminal device, between information about all theme interfaces and corresponding button backlight parameters.

With reference to the first aspect or any one of the first to sixth possible implementation manners of the first aspect, in a seventh possible implementation manner of the first aspect, the turning on the button backlight according to the button backlight parameter includes driving a first current source according to the first duty cycle to turn on the red backlight, driving a second current source according to the second duty cycle to turn on the green backlight, and driving a third current source according to the third duty cycle to turn on the blue backlight.

According to a second aspect, an embodiment of the present disclosure provides a button backlight processing apparatus, including a receiving module configured to receive an instruction for turning on button backlight; a parameter obtaining module configured to obtain a button backlight parameter according to the instruction, where the button backlight parameter is corresponding to a current theme interface of a terminal device; and a turn-on module configured to turn on the button backlight according to the button backlight parameter.

With reference to the second aspect, in a first possible implementation manner of the second aspect, the button backlight parameter includes a first duty cycle of a red component, a second duty cycle of a green component, and a third duty cycle of a blue component in a color of the theme interface; and the turn-on module is configured to correspondingly drive, according to the first duty cycle, the second duty cycle, and the third duty cycle, a red backlight, a green backlight, and a blue backlight that are disposed under a button.

With reference to the second aspect or the first possible implementation manner of the second aspect, in a second possible implementation manner of the second aspect, the parameter obtaining module includes a configuration information obtaining unit configured to obtain configuration information of the color components in the color of the theme interface, where the configuration information of the color components includes a luminance value of the red component, a luminance value of the green component, and a luminance value of the blue component; and a calculation unit configured to obtain, according to the configuration information of the color components, the button backlight parameter corresponding to the theme interface through calculation by using a preset algorithm.

With reference to the second aspect or the first possible implementation manner of the second aspect, in a third possible implementation manner of the second aspect, the parameter obtaining module is configured to obtain a button backlight parameter that has been stored.

With reference to the third possible implementation manner of the second aspect, in a fourth possible implementation manner of the second aspect, the apparatus further includes a storage module; before obtaining the button backlight parameter that has been stored, the parameter obtaining module is further configured to obtain theme interface update information of the terminal device; obtain configuration information of color components in a color of an updated theme interface, where the configuration information of the color components includes a luminance value of a red component, a luminance value of a green component, and a luminance value of a blue component; and obtain, according to the configuration information of the color components, a button backlight parameter corresponding to the theme interface through calculation by using a preset algorithm; the storage module is configured to store the updated button backlight parameter corresponding to the theme interface; and the parameter obtaining module is configured to obtain the updated button backlight parameter that is stored in the storage module and that is corresponding to the theme interface.

With reference to the fourth possible implementation manner of the second aspect, in a fifth possible implementation manner of the second aspect, the parameter obtaining module further includes a monitoring unit configured to monitor a registration entry that records the theme interface; and an update obtaining unit configured to obtain the theme interface update information when the monitoring unit detects that the registration entry is modified.

With reference to the third possible implementation manner of the second aspect, in a sixth possible implementation manner of the second aspect, the parameter obtaining module is configured to obtain information about the current theme interface; and obtain the button backlight parameter corresponding to the current theme interface according to a correspondence, prestored in the terminal device, between information about all theme interfaces and corresponding button backlight parameters.

With reference to the second aspect or any one of the first to sixth possible implementation manners of the second aspect, in a seventh possible implementation manner of the second aspect, the turn-on module is configured to drive a first current source according to the first duty cycle to turn on the red backlight, drive a second current source according to the second duty cycle to turn on the green backlight, and drive a third current source according to the third duty cycle to turn on the blue backlight.

According to the button backlight processing method and apparatus and the terminal device in the embodiments of the present disclosure, button backlight is turned on by using a button backlight parameter corresponding to a current theme interface of the terminal device, thereby achieving a color diversity of the button backlight, and meeting individualized requirements of users.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
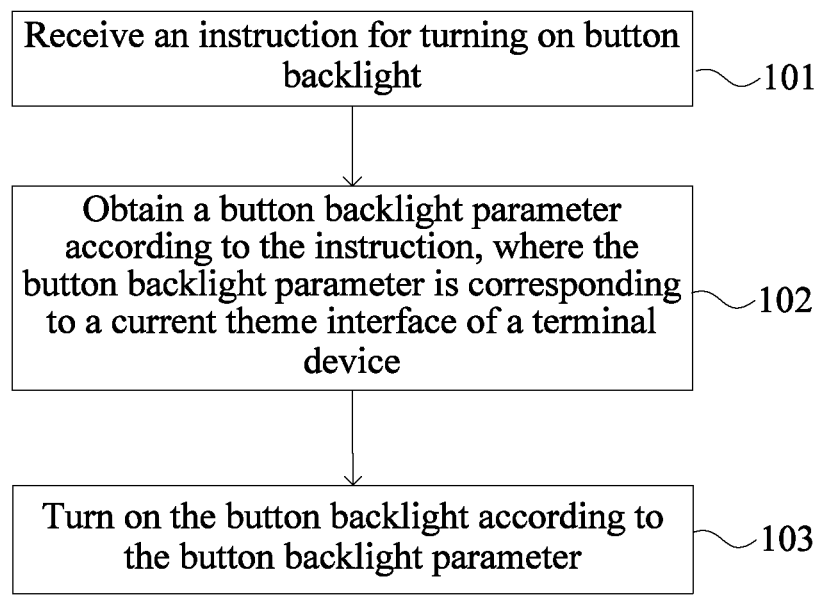
FIG. 1 is a flowchart of Embodiment 1 of a button backlight processing method according to the present disclosure.

FIG. 1 is a flowchart of Embodiment 1 of a button backlight processing method according to the present disclosure. As shown in FIG. 1, the method in this embodiment may include the following steps.

Step 101: Receive an instruction for turning on button backlight.

In this embodiment, when a user performs an operation on a terminal device, for example, touches the home screen of the terminal device, or presses a button on the terminal device, the operation triggers turn-on of a backlight of the button of the terminal device, and triggers sending of the instruction that is for turning on the button backlight, where the button includes a physical button or a virtual button, for example, the button may be a camera button or a return button of the terminal device. In this way, the terminal device, a red green blue (RGB) driver module of the terminal device, can receive the instruction for turning on the button backlight.

Step 102: Obtain a button backlight parameter according to the instruction, where the button backlight parameter is corresponding to a current theme interface of a terminal device.

The button backlight parameter may include a first duty cycle of a red component, a second duty cycle of a green component, and a third duty cycle of a blue component in a color of the theme interface. A duty cycle is a ratio of duration of a positive pulse to a total pulse period in an ideal pulse period sequence, for example, a rectangular wave.

In this embodiment, theme interfaces of the terminal device may be preset in the terminal device, and the user may select a theme interface according to a personal preference. The button backlight parameter is corresponding to the theme interface in a one-to-one manner, that is, each theme interface is corresponding to one button backlight parameter. After receiving the instruction for turning on the button backlight, the terminal device needs to obtain the button backlight parameter, where the parameter is a parameter corresponding to the current theme interface, selected by the user, of the terminal device.

Step 103: Turn on the button backlight according to the button backlight parameter.

In this embodiment, the terminal device turns on the button backlight according to the button backlight parameter obtained in step 102. A color of the button backlight turned on is corresponding to the theme interface, where the button backlight and the theme interface may have a same color, or have similar and relatively coordinating colors. For example, if the current theme interface is purple, correspondingly, there is a button backlight parameter with a purple theme, and the button backlight is turned on according to the button backlight parameter, so that the button backlight is rendered with purple or a color coordinated with purple. This embodiment imposes no limit to a rendered color.

A method for turning on the button backlight by the terminal device may be correspondingly driving, according to the first duty cycle, the second duty cycle, and the third duty cycle that are in the button backlight parameter, a red backlight, a green backlight, and a blue backlight that are disposed under a button. A color that the button finally presents is a mixture of colors of the red backlight, the green backlight, and the blue backlight. For example, the backlight may be a monochromatic light-emitting diode (LED) lamp.

A button backlight in this embodiment may consist of a red LED lamp, a green LED lamp, and a blue LED lamp.

Most of existing button backlight is white and monochromatic. In this embodiment of the present disclosure, a terminal device turns on button backlight by using a button backlight parameter corresponding to a current theme interface of the terminal device, thereby achieving a color diversity of the button backlight, meeting individualized requirements of users.

Figure 2:
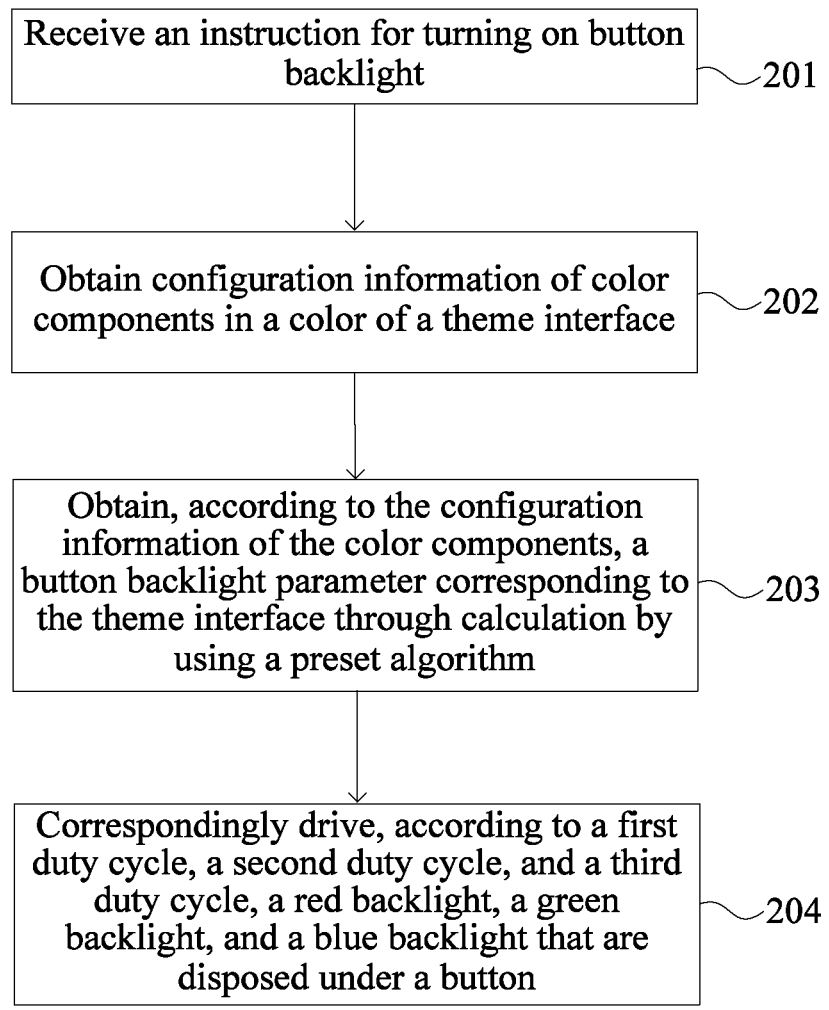
FIG. 2 is a flowchart of Embodiment 2 of a button backlight processing method according to the present disclosure.

FIG. 2 is a flowchart of Embodiment 2 of a button backlight processing method according to the present disclosure. As shown in FIG. 2, the method in this embodiment may include the following steps.

Step 201: Receive an instruction for turning on button backlight.

In this embodiment, a process of receiving the instruction for turning on the button backlight is similar to step 101 in Embodiment 1, and details are not described herein again.

Step 202: Obtain configuration information of color components in a color of a theme interface.

The configuration information of the color components includes a luminance value of a red component, a luminance value of a green component, and a luminance value of a blue component.

In this embodiment, the color of the theme interface consists of three color components, namely, the red color component, the green color component, and the blue color component; the terminal device obtains the configuration information of the color components in the color of the theme interface, where the configuration information of the color components includes the luminance value of the red component, the luminance value of the green component, and the luminance value of the blue component, a value range of the luminance value is 0 to 255, and theme interfaces in different colors are corresponding to different luminance values of the red, green, and blue components, for example, corresponding to a theme interface in wine red, a luminance value of the red component is 240, a luminance value of the green component is 65, and a luminance value of the blue component is 85. Information about the luminance values of the color components may be stored in a registry of the terminal device, and is corresponding to information about the theme interface. For example, the information about the theme interface may be a mark number of the theme interface. The terminal device may obtain the mark number of the current theme interface from the registry, and may obtain configuration information of corresponding color components from the registry according to the mark number.

Step 203: Obtain, according to the configuration information of the color components, a button backlight parameter corresponding to the theme interface through calculation by using a preset algorithm.

In this embodiment, the terminal device calculates the corresponding button backlight parameter according to the configuration information of the color components that is obtained in step 202, that is, calculates a first duty cycle by using the luminance value of the red component, calculates a second duty cycle by using the luminance value of the green component, and calculates a third duty cycle by using the luminance value of the blue component. A calculation process is implemented by using a preset algorithm, where the preset algorithm may be, for example, the following calculation formula:

$$\text{Duty cycle} = (\text{Luminance value} * 100)/255 \qquad (1)$$

If the color of the current theme interface of the terminal device is wine red, the luminance value of the red component is 240, the luminance value of the green component is 65, and the luminance value of the blue component is 85, it is obtained through calculation by using the formula (1) that, in the corresponding button backlight parameter, the first duty cycle is 94.12, the second duty cycle is 25.49, and the third duty cycle is 33.33.

Step 204: Correspondingly drive, according to a first duty cycle, a second duty cycle, and a third duty cycle, a red backlight, a green backlight, and a blue backlight that are disposed under a button.

In this embodiment, a button backlight consists of a red LED lamp, a green LED lamp, and a blue LED lamp, and is located under the button. The terminal device obtains the first duty cycle, the second duty cycle, and the third duty cycle by using step 203, and correspondingly drives, according to the first duty cycle, the second duty cycle, and the third duty cycle, the red LED lamp, the green LED lamp, and the blue LED lamp to be turned on. Luminance of the LED lamps in these colors is determined according to values of the duty cycles.

In this embodiment, a method of turning on the button backlight according to the button backlight parameter may be driving a first current source according to the first duty cycle to turn on the red LED lamp, driving a second current source according to the second duty cycle to turn on the green LED lamp, and driving a third current source according to the third duty cycle to turn on the blue LED lamp. The current sources may be driven in a pulse width modulation (PWM) manner, and output currents of different intensity through adjustment of the duty cycles, to make the luminance of the LED lamps different, so that a final mixture of the colors of the three LED lamps changes according to the color of the theme interface.

In this embodiment, a terminal device obtains configuration information, recorded in a registry, of color components corresponding to a theme interface, and obtains a button backlight parameter through calculation, so that a red backlight, a green backlight, and a blue backlight that are disposed under a button are correspondingly driven by using the duty cycles, thereby diversifying colors of button backlight, and meeting individualized requirements of users.

Figure 3:
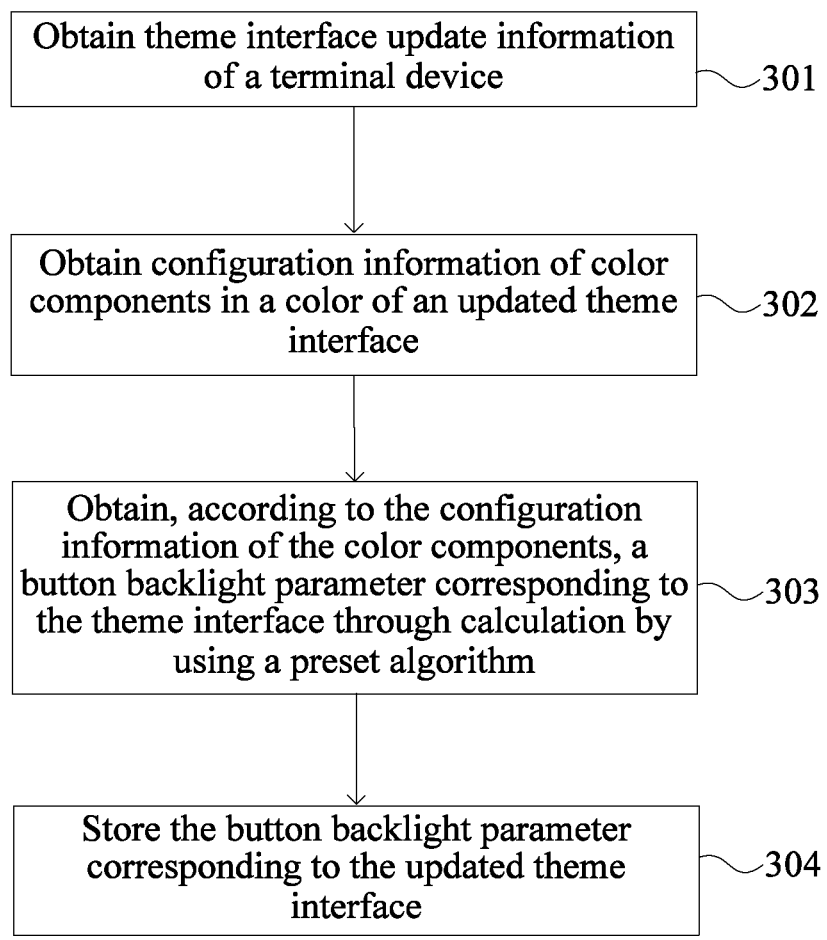
FIG. 3 is a flowchart of Embodiment 3 of a button backlight processing method according to the present disclosure.

FIG. 3 is a flowchart of Embodiment 3 of a button backlight processing method according to the present disclosure. As shown in FIG. 3, a difference between this embodiment and the embodiment shown in FIG. 2 lies in that, in this embodiment, the obtaining a button backlight parameter is obtaining a button backlight parameter that has been stored. In this embodiment, steps that are the same as those in Embodiment 2 are not described in detail again. A method of storing a button backlight parameter in this embodiment includes the following steps.

Step 301: Obtain theme interface update information of a terminal device.

In this embodiment, when a user changes a theme interface of the terminal device, a registration entry that records the theme interface in a registry changes, for example, the change may be that a mark number that identifies the theme interface changes from 1 to 3; the terminal device obtains the theme interface update information of the terminal device.

In this embodiment, a method of obtaining the theme interface update information of the terminal device may be that the terminal device monitors the registration entry that records the theme interface, and obtains the theme interface update information when detecting that the registration entry is modified. For example, when a mark number of a current theme interface is 1, and the terminal device constantly monitors whether the mark number changes; if the mark number changes to 3, it indicates that the user changes the theme interface of the terminal device, and then the terminal device re-records the mark number of the current theme interface as 3, and monitors the information again.

Step 302: Obtain configuration information of color components in a color of an updated theme interface.

In this embodiment, after obtaining the theme interface update information of the terminal device, the terminal device needs to obtain, from the registry, the configuration information of the color components corresponding to the updated theme interface. The obtaining process is similar to step 202 in Embodiment 2, and details are not described herein again.

Step 303: Obtain, according to the configuration information of the color components, a button backlight parameter corresponding to the theme interface through calculation by using a preset algorithm.

In this embodiment, a process of obtaining, by the terminal device according to the configuration information of the color components, the button backlight parameter corresponding to the theme interface through calculation by using the preset algorithm is similar to step 203 in Embodiment 2, and details are not described herein again.

Step 304: Store the button backlight parameter corresponding to the updated theme interface.

In this embodiment, the terminal device obtains a button backlight parameter corresponding to a current theme interface through calculation, and stores the button backlight parameter. When an instruction for turning on button backlight is received and a button backlight parameter needs to be obtained, the terminal device may directly read the stored button backlight parameter, and it is unnecessary to calculate the button backlight parameter each time.

Optionally, in this embodiment, theme interfaces of the terminal device are preset in the terminal device, a quantity of the theme interfaces is limited, and a color of each theme interface is fixed, that is, the theme interfaces are one-to-one corresponding to the configuration information of the color components. Therefore, button backlight parameters corresponding to the theme interfaces may be calculated in advance, and stored corresponding to information about the theme interfaces, for example, a form of a mapping table may be used to associate mark numbers of the theme interfaces with the corresponding button backlight parameters; when a button backlight parameter needs to be obtained, the terminal device searches the mapping table according to a mark number of a current theme interface.

In this embodiment, a button backlight parameter is prestored, so that the button backlight parameter can be obtained directly, thereby reducing power consumption caused by calculation required for obtaining the button backlight parameter each time.

Figure 4:
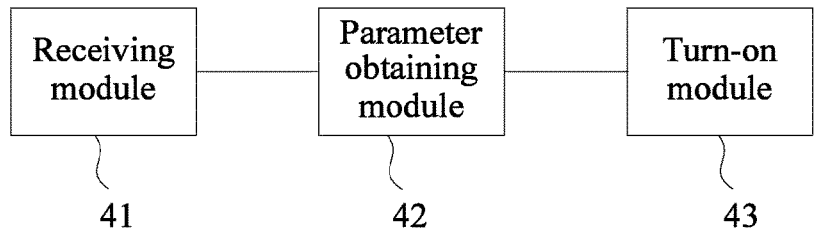
FIG. 4 is a schematic structural diagram of Embodiment 1 of a button backlight processing apparatus according to the present disclosure.

FIG. 4 is a schematic structural diagram of Embodiment 1 of a button backlight processing apparatus according to the present disclosure. As shown in FIG. 4, the apparatus in this embodiment may include a receiving module 41, a parameter obtaining module 42, and a turn-on module 43. The receiving module 41 is configured to receive an instruction for turning on button backlight; the parameter obtaining module 42 is configured to obtain a button backlight parameter according to the instruction, where the button backlight parameter is corresponding to a current theme interface of a terminal device; and the turn-on module 43 is configured to turn on the button backlight according to the button backlight parameter. In this embodiment, the button may be a virtual button and/or a physical button.

Figure 5:
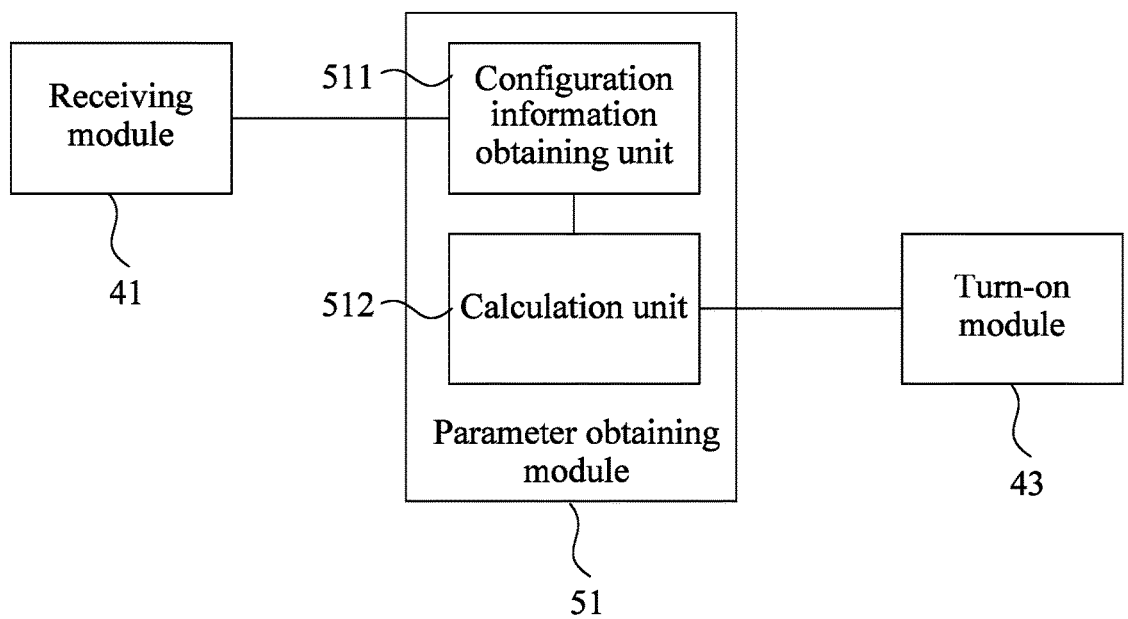
FIG. 5 is a schematic structural diagram of Embodiment 2 of a button backlight processing apparatus according to the present disclosure.

FIG. 5 is a schematic structural diagram of Embodiment 2 of a button backlight processing apparatus according to the present disclosure. As shown in FIG. 5, on the basis of the structure of the apparatus shown in FIG. 4, according to the apparatus in this embodiment, further, a parameter obtaining module 51 may include a configuration information obtaining unit 511 and a calculation unit 512. The configuration information obtaining unit 511 is configured to obtain configuration information of color components in a color of the theme interface, where the configuration information of the color components includes a luminance value of a red component, a luminance value of a green component, and a luminance value of a blue component; the calculation unit 512 is configured to obtain, according to the configuration information of the color components, a button backlight parameter corresponding to the theme interface through calculation by using a preset algorithm.

Figure 6A:
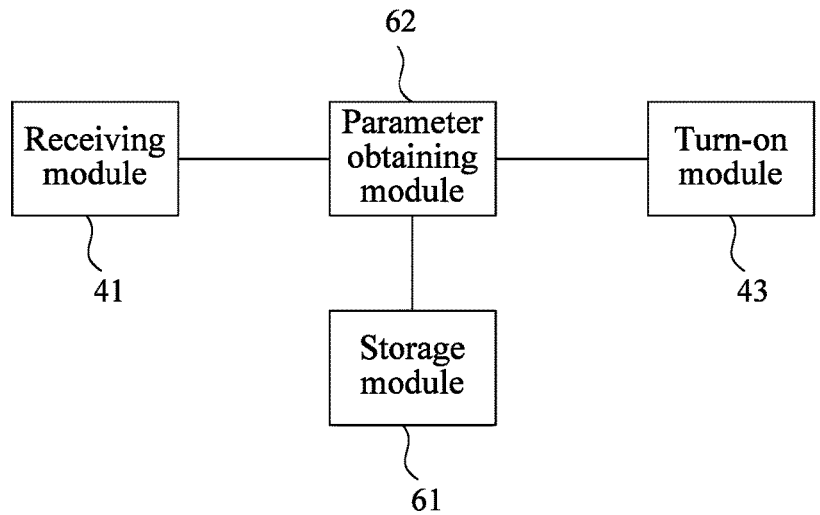
FIG. 6A is a schematic structural diagram of Embodiment 3 of a button backlight processing apparatus according to the present disclosure.
Figure 6B:
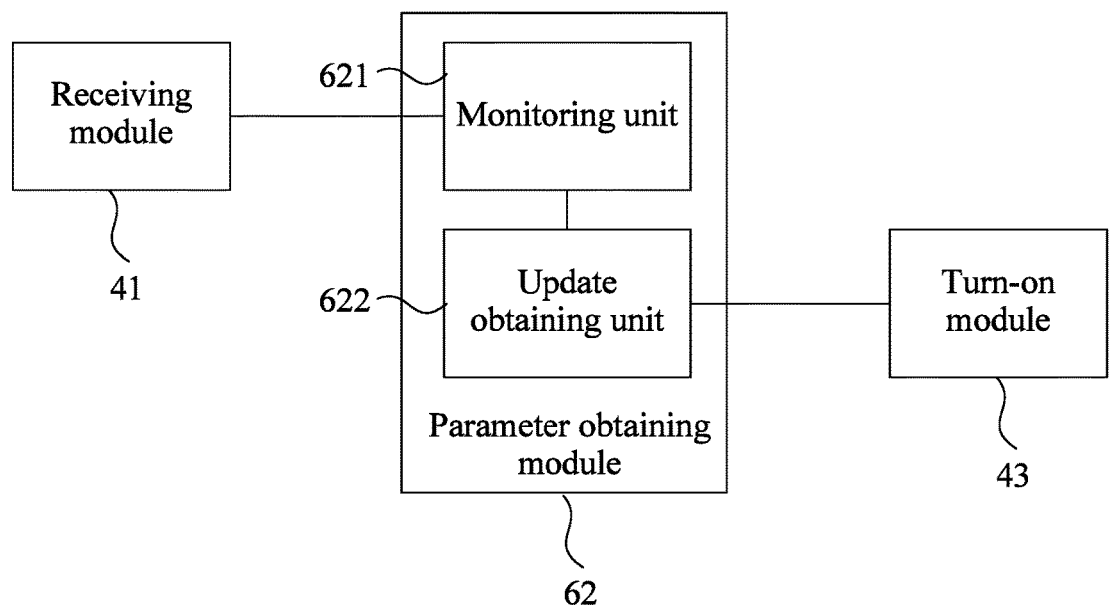
FIG. 6B is a schematic structural diagram of Embodiment 4 of a button backlight processing apparatus according to the present disclosure.

FIG. 6A is a schematic structural diagram of Embodiment 3 of a button backlight processing apparatus according to the present disclosure, and FIG. 6B is a schematic structural diagram of Embodiment 4 of a button backlight processing apparatus according to the present disclosure. As shown in FIG. 6A, on the basis of the structure of the apparatus shown in FIG. 4, the apparatus in this embodiment may further include a storage module 61 configured to store an updated button backlight parameter corresponding to a theme interface. Then, a parameter obtaining module 62 is configured to obtain the updated button backlight parameter that is stored in the storage module 61 and that is corresponding to the theme interface.

Further, as shown in FIG. 6B, the parameter obtaining module 62 may further include a monitoring unit 621 and an update obtaining unit 622, where the monitoring unit 621 is configured to monitor a registration entry that records the theme interface; and the update obtaining unit 622 is configured to obtain theme interface update information when the monitoring unit 621 detects that the registration entry is modified.

The foregoing apparatus embodiments may be used to execute the technical solutions of the method embodiments that are described above, where implementation principles and technical effects of the apparatus embodiments are similar to those of the method embodiments, and are not described in detail herein again.

Figure 7A:
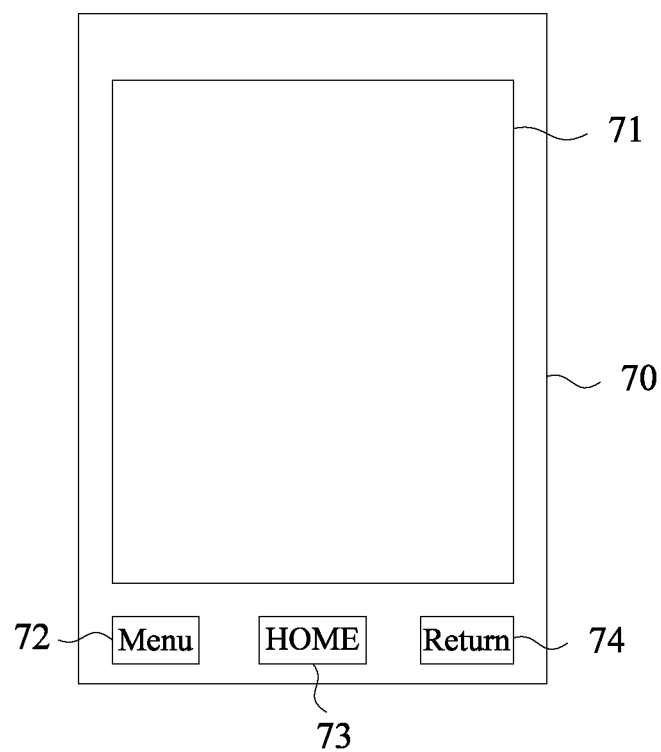
FIG. 7A is a schematic structural diagram of Embodiment 1 of a terminal device according to the present disclosure.
Figure 7B:
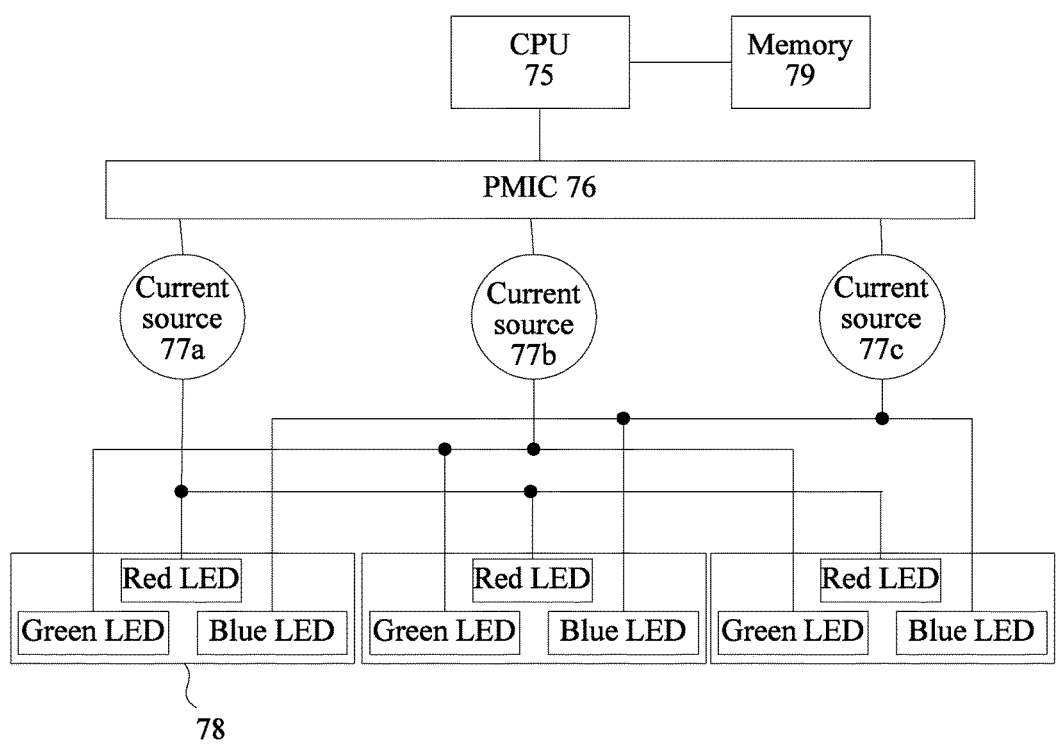
FIG. 7B is a schematic structural diagram of Embodiment 2 of a terminal device according to the present disclosure.

FIG. 7A is a schematic structural diagram of Embodiment 1 of a terminal device according to the present disclosure, and FIG. 7B is a schematic structural diagram of Embodiment 2 of a terminal device according to the present disclosure. With reference to FIG. 7A and FIG. 7B, a terminal device 70 in this embodiment may be, for example, a smartphone, a personal digital assistant (PDA), or the like, which is not limited in this embodiment. The terminal device 70 may include a screen 71 configured to display an image and a color, and may further include, for example, three buttons. In this embodiment, the three buttons are a menu button 72, a home button 73, and a return button 74, where the menu button 72 and the return button 74 may be virtual buttons, and the home button 73 may be a physical button. A quantity of buttons and a position of a button may be determined according to an actual situation of the terminal device, which is not limited in this embodiment.

Each button is corresponding to one backlight group 78, where the backlight group 78 is located under the button; that is, the menu button 72, the home button 73, and the return button 74 each have one backlight group 78, and the backlight groups 78 are used in the following manner. When a button is pressed, a corresponding backlight group is turned on, to generate a color that is the same as or similar to a color of a theme interface. As shown in FIG. 7B, each backlight group 78 includes a red LED, a green LED, and a blue LED; red LEDs of all the backlight groups 78 are connected to a current source 77a, green LEDs of all the backlight groups 78 are connected to a current source 77b, and blue LEDs of all the backlight groups 78 are connected to a current source 77c; the current source 77a, the current source 77b, and the current source 77c are all connected to a power management integrated circuit (PMIC) 76 of the terminal device. The current source in this embodiment may be an ideal current source that can always provide a fixed current to the external regardless of voltages at two ends of the current source. In practice, if a current of a current source does not fluctuate obviously when a voltage thereof changes, it is generally assumed that the current source is an ideal current source, and the current source is implemented by using a current source circuit, where the current source circuit may be integrated in the PMIC 76, or may be a current source circuit externally connected to the PMIC 76. For example, the current sources 77a, 77b, and 77c are current source circuits for implementing ideal current sources. The PMIC 76 is connected to a central processing unit (CPU) 75, and the CPU 75 is connected to a memory 79 of the terminal device.

Further, in this embodiment, a light mixing material may further be disposed between the backlight groups 78 and the menu button 72, the home button 73, and the return button 74 of the terminal device 70, for example, the light mixing material may be a light guide plate. A function of the light mixing material is to evenly mix colors of the red LEDs, the green LEDs, and the blue LEDs of the backlight groups 78.

In this embodiment, an instruction of the terminal device is stored in the memory 79, and the CPU 75 accesses the instruction in the memory 79, and executes the instruction.

In this embodiment, the CPU 75 of the terminal device may implement the steps in the method embodiments by executing the instruction, including receiving an instruction for turning on button backlight, and obtaining a button backlight parameter according to the instruction. A process of obtaining the button backlight parameter may be first obtaining configuration information of color components in a color of a theme interface, and then obtaining the button backlight parameter through calculation according to a preset algorithm, as described in Embodiment 2 of the method shown in FIG. 2, or obtaining a button backlight parameter that has been stored, as described in Embodiment 3 of the method shown in FIG. 3; a process of storing the button backlight parameter is also the same as the steps in Embodiment 3 of the method, and details are not described herein again.

After obtaining the button backlight parameter, the CPU 75 sends the button backlight parameter to the PMIC 76 of the terminal device; after receiving the button backlight parameter, the PMIC 76 drives, according to a first duty cycle in the parameter, the current source 77a to generate a current of corresponding intensity, to turn on a red LED of a backlight group; drives, according to a second duty cycle in the parameter, the current source 77b to generate a current of corresponding intensity, to turn on a green LED of the backlight group; and drives, according to a third duty cycle in the parameter, the current source 77c to generate a current of corresponding intensity, to turn on a blue LED of the backlight group. Luminance of the LEDs in the colors is related to intensity of currents generated by the current sources. By means of the function of the light mixing material, colors of the three monochromatic LEDs are evenly mixed, and a color that is finally presented by the button backlight is an effect after the colors are mixed by using the light mixing material.

The terminal device may execute the technical solution in any method embodiment in FIG. 1 to FIG. 3, where an implementation principle and a technical effect of the terminal device are similar to those of the method embodiments, and are not described in detail herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A button backlight processing method, comprising:
receiving an instruction for turning on a button backlight;
obtaining a button backlight parameter according to the instruction, wherein the button backlight parameter is selected from amongst a plurality of button backlight parameters and is selected, by a terminal device, based on the button backlight parameter matching a current interface theme of the terminal device; and
turning on the button backlight according to the button backlight parameter,
wherein obtaining the button backlight parameter comprises obtaining the button backlight parameter that has been stored,
wherein before obtaining the button backlight parameter that has been stored, the method further comprises:
obtaining information indicating that the interface theme of the terminal device is updated;
obtaining configuration information of color components in a color of the updated interface theme, wherein the configuration information of the color components comprises a luminance value of a red component, a luminance value of a green component, and a luminance value of a blue component;
obtaining, according to the configuration information of the color components, a button backlight parameter corresponding to the updated interface theme through calculation by using a preset algorithm; and
storing the button backlight parameter corresponding to the updated interface theme,
wherein obtaining the button backlight parameter that has been stored comprises obtaining the stored button backlight parameter corresponding to the updated interface theme.

2. The method according to claim 1, wherein the button backlight parameter comprises a first duty cycle of a red component, a second duty cycle of a green component, and a third duty cycle of a blue component in a color of the interface theme, and wherein turning on the button backlight according to the button backlight parameter comprises correspondingly driving, according to the first duty cycle, the second duty cycle, and the third duty cycle, a red backlight, a green backlight, and a blue backlight that are disposed under a button.

3. The method according to claim 1, wherein obtaining the button backlight parameter comprises:
obtaining configuration information of color components in a color of the interface theme, wherein the configuration information of the color components comprises a luminance value of a red component, a luminance value of a green component, and a luminance value of a blue component; and
obtaining, according to the configuration information of the color components, the button backlight parameter corresponding to the interface theme through calculation using a preset algorithm.

4. The method according to claim 1, wherein before obtaining the information indicating that the interface theme of the terminal device is updated, the method further comprises monitoring a registration entry that records the interface theme, and wherein obtaining the information indicating that the interface theme of the terminal device comprises obtaining the information indicating the interface theme when the registration entry is modified.

5. The method according to claim 1, wherein obtaining the button backlight parameter that has been stored comprises:
obtaining information about the current interface theme; and
obtaining the button backlight parameter corresponding to the current interface theme according to a correspondence, prestored in the terminal device, between information about all interface themes and corresponding button backlight parameters.

6. The method according to claim 1, wherein turning on the button backlight according to the button backlight parameter comprises driving a first current source according to a first duty cycle to turn on a red backlight, driving a second current source according to a second duty cycle to turn on a green backlight, and driving a third current source according to a third duty cycle to turn on a blue backlight.

7. A terminal comprising:
a button backlight;
a display;
a memory; and
a processor coupled with the memory, the display, and the button backlight, wherein the processor is configured to:
receive an instruction for turning on the button backlight;
obtain a button backlight parameter according to the instruction, wherein the button backlight parameter is selected from amongst a plurality of button backlight parameters and is selected, by the terminal, based on the button backlight parameter matching a current interface theme of the terminal;
turn on the button backlight according to the button backlight parameter;
obtain the button backlight parameter that has been stored;
obtain information indicating that the interface theme of the terminal is updated;
obtain configuration information of color components in a color of the updated interface theme, wherein the configuration information of the color components comprises a luminance value of a red component, a luminance value of a green component, and a luminance value of a blue component;

obtain, according to the configuration information of the color components, a button backlight parameter corresponding to the updated interface theme through calculation using a preset algorithm;

store the button backlight parameter corresponding to the updated interface theme; and obtain the stored button backlight parameter corresponding to the updated interface theme.

8. The terminal according to claim 7, wherein the button backlight parameter comprises a first duty cycle of a red component, a second duty cycle of a green component, and a third duty cycle of a blue component in a color of the interface theme, and wherein the processor is configured to correspondingly drive, according to the first duty cycle, the second duty cycle, and the third duty cycle, a red backlight, a green backlight, and a blue backlight that are disposed under a button.

9. The terminal according to claim 7, wherein the processor is configured to:

obtain configuration information of color components in a color of the interface theme, wherein the configuration information of the color components comprises a luminance value of a red component, a luminance value of a green component, and a luminance value of a blue component; and obtain, according to the configuration information of the color components, the button backlight parameter corresponding to the interface theme through calculation using a preset algorithm.

10. The terminal according to claim 7, wherein the processor is configured to:

monitor a registration entry that records the interface theme; and obtain the information indicating the interface theme when the registration entry is modified.

11. The terminal according to claim 7, wherein the processor is configured to:

obtain information about the current interface theme; and obtain the button backlight parameter corresponding to the current interface theme according to a correspondence, prestored in the terminal, between information about all interface themes and corresponding button backlight parameters.

12. The terminal according to claim 7, wherein the processor is configured to drive a first current source according to a first duty cycle to turn on a red backlight, drive a second current source according to a second duty cycle to turn on a green backlight, and drive a third current source according to a third duty cycle to turn on a blue backlight.

* * * * *